(No Model.)
F. L. HARRIS.
MANUFACTURE OF FERTILIZING MATERIALS.
No. 303,371. Patented Aug. 12, 1884.
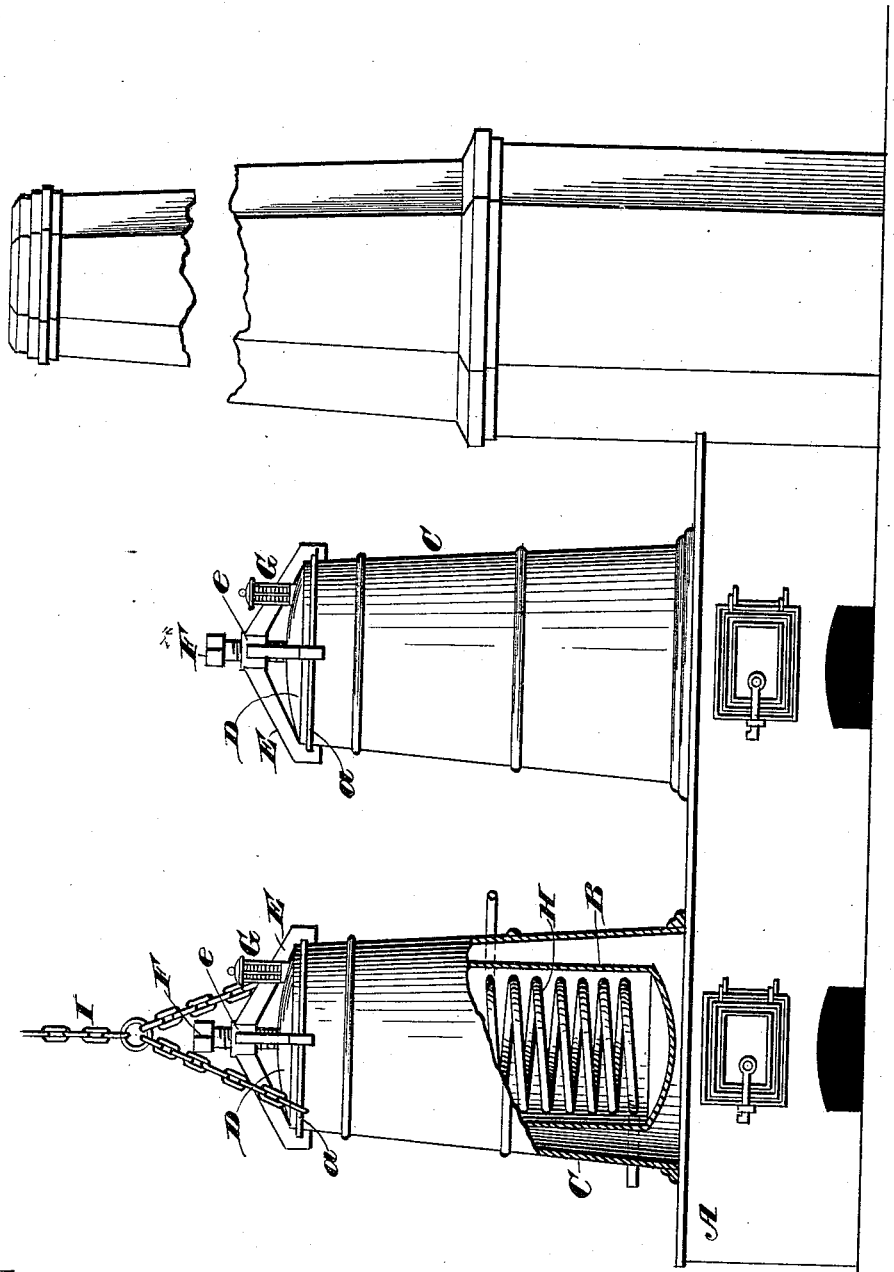

UNITED STATES PATENT OFFICE.

FRANK L. HARRIS, OF BALTIMORE, MARYLAND, ASSIGNOR, BY MESNE AS-SIGNMENTS, OF ELEVEN-FIFTEENTHS TO T. MARSHALL SMITH, ROBERT W. SMITH, AND THOMAS L. FIELD, ALL OF SAME PLACE.

MANUFACTURE OF FERTILIZING MATERIALS.

SPECIFICATION forming part of Letters Patent No. 303,371, dated August 12, 1884.

Application filed January 15, 1884. (No model.)

*To all whom it may concern:*

Be it known that I, FRANK L. HARRIS, a citizen of the United States, residing at Baltimore, in the State of Maryland, have invented new and useful Improvements in the Manufacture of Fertilizing Materials, of which the following is a specification.

My invention consists in the method of treating phosphates, mineral and phosphatic guanos, oyster and marine shells, and lime-bearing substances generally, whereby they may be prepared for use as fertilizers, said method consisting in placing such substances in a closed vessel, in either water or an enriched liquor obtained as hereinafter described, and raising the temperature to a point between 250° to 320° Fahrenheit, or even higher, whereby sufficient pressure is created to drive the fluid into every part of the substance treated, rendering it friable, and, when an enriched liquor is used, combining its animal matter with the said substance, as well as rendering it friable and preparing it to be easily crumbled and ground.

To obtain the enriched liquor referred to above, I subject bone, hoof, horn, leather, hair, dead animals, offal from slaughter-houses, fish, and fish offal to a like treatment.

It is well known that the several animal substances named above, which are all rich in nitrogenous matter, contain a certain percentage thereof in excess of that required to render them efficient as fertilizers, while, upon the other hand, many natural fertilizers—such as phosphates, phosphatic guanos, marl, marine shells, and lime-bearing substances generally—are entirely deficient, or substantially so, in this constituent. It is one purpose of my invention, therefore, to remove from the one class of substances the surplus of this element and supply it to the other without impairing the usefulness as fertilizers of the animal substances named, which I propose to utilize by converting them into fertilizers in the manner herein set forth. In carrying out this portion of my invention I first treat any one of the nitrogenous animal matters named in water, which is heated in a closed vessel to 250°, or from that point to 320°, Fahrenheit, or higher, the pressure produced by the raised temperature of the water forcing it into every part of the substance under treatment. This process being completed, the contents of the vessel are rapidly cooled by suitable means, and the liquid part will be found to consist of the water holding in solution a quantity of soluble animal matter derived from the substance under treatment. This enriched liquor may be pumped off for future use, as hereinafter described, while the animal substance itself, which has been subjected to the aforesaid treatment, upon being removed and dried will be found friable, and readily ground for use as a fertilizer, alone or in combination with other fertilizing substances.

The above process may be continued, if desired, by treating a fresh supply of animal matter in the same way in the liquor obtained by the first treatment, so as still further to enrich the liquor. Having obtained a liquor thus enriched with animal matter by the process above explained, to impart the fertilizing ingredients contained in such liquor to phosphates, mineral and phosphatic guanos, oyster and marine shells, and lime-bearing substances generally, which are deficient in nitrogeneous matter, the substance is placed in the enriched liquor, instead of water, and treated in all respects as hereinbefore set forth, and when so treated, cooled, and dried it will be found to have become friable and easily reduced to powder containing a percentage of animal matter derived from the liquor in which it is treated, and forming a readily-soluble and easily-assimilated food for plants.

The drawing accompanying this application shows a form of apparatus for carrying out my said process, the figure representing a side elevation of said apparatus, part of the same being broken away to show the inner construction. The construction of said apparatus is as follows: A indicates the furnace, which is of any suitable pattern. Above said furnace is arranged a retort, B, surrounded by a shell or jacket, C. A steam-tight cap or lid, D, closes the top of the retort, being fastened down by arms E, which radiate from a central ring, e, and hook under a flange, a, upon the shell C. The ring e has a threaded perforation, through which passes a bolt, F, which is screwed down upon the lid D, and forces it tightly down upon the retort. A steam-gage, G, is applied to the lid D to indicate the steam-pressure within the boiler, and a thermometer to indicate the temperature of the contents of the retort may also be mounted in the lid D. Within the lower portion of the retort I place a coil, H, the pipe entering above and emerging at the bottom of said retort. This coil may be used to aid the heating of the contents of the retort, which may be done by driving hot water or steam through the coil; or it may be used to cool the charge in the retort, after the heating process has terminated, by forcing the cold water through the same. The coil H within the retort may extend from top to bottom, and instead of a single coil, another one in addition to that shown may be employed, whereby the heating and cooling can be carried on by separate pipes.

Having thus described my invention, what I claim is—

In the manufacture of fertilizers, the process herein described of treating phosphates, mineral and phosphatic guanos, marine and oyster shells, lime-bearing and other substances, said process consisting in placing such substances in a closed vessel in the presence of enriched liquor extracted from animal substances in the manner described, or of water, and raising the temperature to a point between 250° and 320° Fahrenheit, or higher, whereby the fluid is driven by the pressure of the inclosed vapor into every part of the substance treated, after which the product is dried and broken up, substantially as described.

In testimony whereof I have hereunto set my hand in the presence of two subscribing witnesses.

FRANK L. HARRIS.

Witnesses:
 DAVID GEMSE,
 F. J. WELCH.